US 6,667,373 B2

(12) United States Patent
Grolitzer et al.

(10) Patent No.: US 6,667,373 B2
(45) Date of Patent: Dec. 23, 2003

(54) POLYMERIZATION PROCESS

(75) Inventors: Marilyn Grolitzer, Wilbraham, MA (US); Jun Lu, East Longmeadow, MA (US); Ming Zhao, East Longmeadow, MA (US)

(73) Assignee: UCB Chip, Inc., Wilmington, DE (US)

( * ) Notice: Subject to any disclaimer, the term of this patent is extended or adjusted under 35 U.S.C. 154(b) by 0 days.

(21) Appl. No.: 10/118,811

(22) Filed: Apr. 8, 2002

(65) Prior Publication Data

US 2002/0156215 A1 Oct. 24, 2002

Related U.S. Application Data

(60) Division of application No. 09/273,706, filed on Mar. 22, 1999, now Pat. No. 6,391,984, which is a continuation-in-part of application No. 08/954,880, filed on Oct. 21, 1997.

(51) Int. Cl.[7] .................................................. C08F 2/02
(52) U.S. Cl. ......................... 526/65; 526/319; 526/242
(58) Field of Search ............................ 526/65, 319, 242

(56) References Cited

U.S. PATENT DOCUMENTS

| | | | |
|---|---|---|---|
| 3,166,508 A | * | 1/1965 | Fields et al. |
| 3,950,298 A | | 4/1976 | McCown et al. |
| 4,394,134 A | | 7/1983 | Rowe |
| 4,501,845 A | | 2/1985 | Baus et al. |
| 5,240,771 A | | 8/1993 | Brueckmann et al. |
| 5,270,378 A | | 12/1993 | Johnson et al. |
| 5,284,902 A | | 2/1994 | Huber et al. |
| 5,350,795 A | | 9/1994 | Smith et al. |
| 5,391,631 A | | 2/1995 | Porsch et al. |
| 5,543,477 A | | 8/1996 | Latiolais et al. |
| 5,637,142 A | | 6/1997 | Kubo et al. |
| 5,766,513 A | | 6/1998 | Pillon et al. |

FOREIGN PATENT DOCUMENTS

| | | |
|---|---|---|
| EP | 0422822 A1 | 4/1991 |
| EP | 0234601 | 7/1991 |
| JP | 59173109 A5 | 10/1984 |
| JP | 59173109 * | 10/1984 |
| WO | WO 9704051 | 2/1997 |

* cited by examiner

*Primary Examiner*—David W. Wu
*Assistant Examiner*—William Cheung
(74) *Attorney, Agent, or Firm*—Lathrop & Gage LC

(57) ABSTRACT

A staged method of forming vinyl (e.g. acrylate) copolymer by solution polymerization which involves a) charging up to 90% of at least two vinyl monomers of the vinyl copolymer to a first stage reaction zone, b) polymerizing the at least two vinyl monomers to about 10 to 90% conversion in the presence of an initiator at an initiator to monomers mole ratio within a specified range, the monomer content of one of the at least two vinyl monomers of the copolymer formed in the first stage being higher than the content of another of the at least two vinyl monomers in the first stage polymer, the weight average molecular weight of the first stage copolymer being about 2000 to 500,000 Daltons; and c) continuing polymerization in the presence of an initiator in a second stage while continuously adding the balance of the monomers of said vinyl copolymer to the polymerization reaction mixture of the first stage at a monomers ratio lower in the one monomer than in the first stage monomers ratio, the initiator to monomers mole ratio in the second stage being different than in the first stage; the vinyl copolymer formed gradually continuously changing in molecular weight from the first stage and increasing in concentration of the one monomer during the second stage, the weight average molecular weight of the total copolymer of both stages being about 2,000 to 250,000 Daltons.

3 Claims, 1 Drawing Sheet

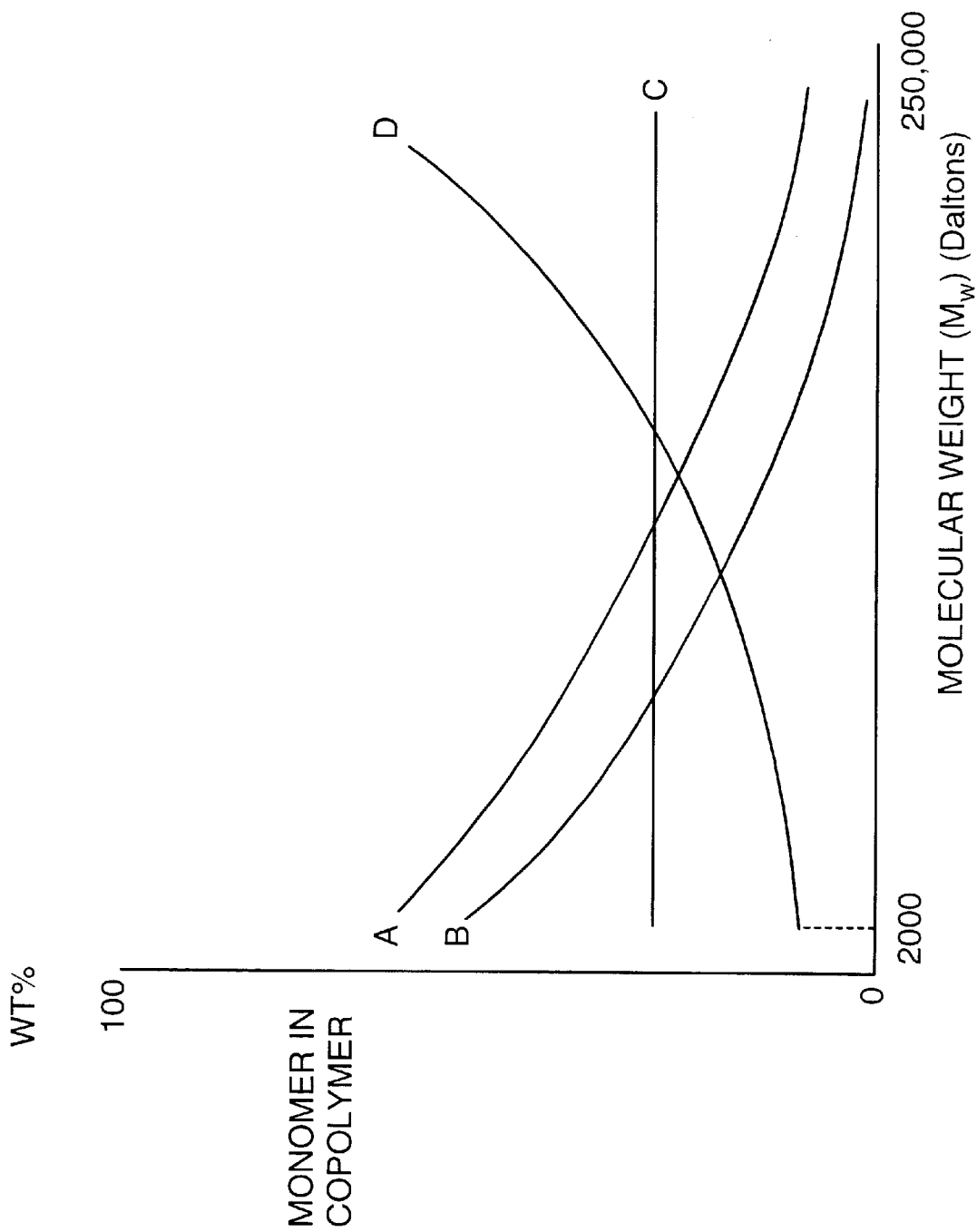

POLYMERIZATION PROCESS

CROSS REFERENCE TO RELATED APPLICATION

This application is a divisional application of copending application Ser. No. 09/273,706, filed Mar. 22, 1999 now U.S. Pat. No. 6,391,984 which is a continuation-in-part of copending application Ser. No. 08/954,880, filed Oct. 21, 1997 pending the disclosure of which is incorporated herein by reference.

BACKGROUND OF THE INVENTION

This invention relates to a polymerization process for preparing copolymers of two or more vinyl monomers.

Commonly assigned copending U.S. application Ser. No. 08/954,880, filed Oct. 21, 1997 pending, for Foaming-Resistant Hydrocarbon Oil Compositions by Grolitzer and Zhao describes polymeric acrylate compositions effective as foam suppressants at low concentrations in hydrocarbon oils over a broad range of temperatures encountered in use. Acrylate copolymers with chemical properties tailored for defoaming effectiveness at one temperature range are not effective at a significantly different temperature range. More particularly, if ethyl acrylate (EA) content or molecular weight of the acrylate copolymer is too high, defoaming at low temperature (about 25° C.) is poor even though satisfactory at high temperature (up to about 100° C.). Conflictingly, decreasing EA content and molecular weight to improve low temperature effectiveness sacrifices performance at high temperature. Physical blending of different acrylate copolymers to solve these contradictory requirements does not work and instead promotes foaming. To the best of applicants' knowledge, foam suppressants before the invention of this and the copending application were designated for use over a narrow temperature range, typically requiring individually different compositions for effective use over different use temperature ranges.

It would be desirable to provide a process for preparing acrylate polymers with chemical properties effective in use over a broad temperature range.

SUMMARY OF THE INVENTION

Now improvements have been made which are capable of flexibly providing vinyl polymers which are effective over a broad range of use conditions.

Accordingly, a principal object of this invention is to provide a polymerization process for preparing vinyl copolymers which, during polymerization, produces a continuous gradual change in polymer composition and molecular weight.

Another object is to provide such a process which forms a polymer fraction with a certain monomeric composition during one phase and another polymer fraction of different monomer composition and molecular weight in a second phase.

A specific object is to provide such a process wherein the copolymer is acrylate copolymer useful in the foam suppressant application disclosed in the noted copending application.

Other objects of this invention will in part be obvious and will in part appear from the following description and claims.

These and other objects are accomplished by providing a staged method of forming vinyl, preferably acrylate, copolymer by solution polymerization which comprises: a) charging a positive amount up to 90% of at least two vinyl monomers of the vinyl copolymer to a first stage reaction zone; b) polymerizing the at least two vinyl monomers to about 10 to 90% conversion in the presence of an initiator at an initiator to monomers mole ratio of about $1 \times 10^{-4}:1$ to $5 \times 10^{-2}:1$, the monomer content of one of the at least two vinyl monomers of the copolymer formed in the first stage being higher than the content of another of the at least two vinyl monomers in the first stage polymer, the weight average molecular weight of the first stage copolymer being about 2000 to 500,000 Daltons; and c) continuing polymerization in the presence of an initiator in a second stage while continuously adding the balance of the monomers of the vinyl copolymer to the polymerization reaction mixture of the first stage at a monomers ratio lower in the one monomer than in the first stage monomers ratio, the initiator to monomers mole ratio in the second stage being different than in the first stage, the vinyl copolymer formed gradually continuously changing in weight average molecular weight from the first stage and decreasing in concentration of the one monomer during the second stage, the weight average molecular weight of the total copolymer of the first stage and the second stage being about 2,000 to 250,000 Daltons.

DETAILED DESCRIPTION OF THE DRAWING

In describing the invention, reference will be made to the accompanying drawing which is a graph schematically illustrating copolymer compositions which can be formed during a stage of the process of the invention.

DETAILED DESCRIPTION OF THE INVENTION

The staged process of the invention provides vinyl copolymer which during polymerization continuously varies in composition as molecular weight varies. The graph of the drawing exemplarily depicts the composition of four monomers, schematically called A,B,C and D, in a copolymer being formed for a particular polymerization cycle in the second stage as a function of polymer molecular weight. If the same monomers A,B,C and D were present and polymerizing in the first stage, the polymerized monomers concentration in the polymer at the end of the first and start of the second stage is shown at the start of the graph on the left side, i.e. about 60% A, 50% B, 30% C and 15% D. Molecular weight in the first stage is controlled by the initiator to monomer ratio which for the illustration of the graph would be on the high side to produce molecular weight on the low side of 2000 as shown. However, the versatile process of the invention can be tailored to provide the reverse, i.e. the initiator to monomers ratio can be relatively lower than implied for the graph to provide higher rather than lower molecular weight in the first stage. The extent of reduction in the second stage in concentration of monomers A and B in the polymer, and increase in D monomer is a function of the level of conversion of the monomers allowed to occur in the first stage before the onset of different polymerization conditions at start of the second stage. For the exemplary scheme depicted in the graph, A and B concentration in the polymerizing mixture in the second stage is declining from the first stage whereas D concentration is increasing and thus the curves for A and B drop off while D increases toward the right on the graph, as total copolymer molecular weight increases as a result of reduction in the initiator to monomers ratio in the second stage. The constant composition of monomer C in the polymer across the full molecular weight range is achieved by holding monomer C concentration in the total monomers mixture the same in both the first and second stages. A further description by stages follows.

First Stage

Polymer formed is primarily controlled by i) ratio of monomers in the polymerizing monomers mixture; ii) initiator/monomers ratio; and iii) level of monomers conversion. Each of these parameters can be varied as desired depending on desired chemical composition of the final polymer. The ratio of monomers in the monomers mixture is fixed and strictly a function of the amounts of those monomers charged to the first stage reaction zone and desired in the polymer fraction of the first stage. The number of monomers is usually determined by the eventual use application of the polymer of the process. For process simplicity up to four monomers are preferred and the amount of any one monomer in the monomers mixture can vary between 0 to 100 weight %. Moreover a monomer may be first used in the second stage without presence at all in the first stage (or vice versa). All monomers are charged at once to the first stage reaction zone so the polymer fraction formed throughout the first stage has the same polymerized monomer composition. A positive amount up to 90% of the total monomers of the final polymer are charged; conversion is up to 90% (e.g. 10 to 90%); preferred conversion is 20 to 80% of monomers charged. Initiator/monomers ratio depends on how polymer molecular weight is to be controlled—the higher the molecular weight, the lower the ratio and vice versa. Preferred initiator/monomers mole ratio is about $1\times10^{-4}$:1 to $5\times10^{-2}$:1, most preferably $1\times10^{-4}$:1 to $2\times10^{-2}$1.

Second Stage

Copolymerization continues in situ in the same reaction zone as the first stage. Monomers may be identical or different from those in the first stage, are continuously charged over time (i.e. over part or all of the balance of the polymerization cycle) instead of in bulk and are at a different ratio in the mixture from the first stage. Polymer formed continuously changes in monomers composition in accordance with the ratio of monomers in the mixture being continuously added, as well as the ratio of unconverted monomers left from the first stage. The initiator/monomers ratio is different from the first stage and depends on whether polymer molecular weight is to decrease or increase. The mole ratio is based on total monomers charged in the second stage and, though different, is within the range noted above for the first stage—i.e. about $1\times10^{-4}$:1 to $5\times10^{-2}$:1.

The process of the invention forms vinyl copolymers from any two or more vinyl monomers which each contain at least one —C=C— vinyl group in its molecular structure. The vinyl monomer may have one or more functional groups, e.g. hydroxy, epoxy, carboxyl, carboxylic anhydride, carbonyl, amino and amido. Exemplary usable vinyl monomers include styrene, acrylonitrile, alkylated ($C_1$–$C_{10}$) styrene, alkyl ($C_1$–$C_{18}$) methacrylates, alkyl ($C_1$–$C_{18}$) maleates or ($C_1$–$C_8$) fumarates and vinyl esters of aliphatic monocarboxylic acid esters. Others include N-vinyl imidazole or N-vinyl pyridine grafted with functional groups. Also vinyl functional silanes such as vinyl triethoxysilane, vinyl trimethoxysilane, vinyl-tris(2-methoxyethoxy) silane; methacryl functional silanes such as gamma-methacryloxylpropyltri-methoxysilane and acrylate polysiloxane commercially available as Tegomer® from Tego Company. Preferred monomers are alkyl acrylates where the alkyl radical has 1 to 18 carbon atoms, for example ethylacrylate and 2-ethylhexyl acrylate and fluorinated alkyl acrylate of the type disclosed in the above-referenced copending application. Also fluoroolefins (e.g. of the formula $C_nF_{(2n+1)}CH=CH_2$ where n=1 to 20), fluorochemical acrylates of the formula $R_fCH_2CH_2OOCCH=CH_2$ where $R_f=C_nF_{2n+1}$ where n=1 to 20, fluorochemical methacrylates of the formula $R_fCH_2CH_2OOCC(CH_3)=CH_2$ where $R_f$ is as just described above.

Preferred polymer compositions useful as foam suppressing additives in hydrocarbon oil compositions comprise a) 10 to 80 wt. % ethyl acrylate and 20 to 90 wt. % 2-ethylhexyl acrylate and b) 10 to 80 wt. % ethyl acrylate, 20 to 90 wt. % 2-ethylhexyl acrylate and 0 to 20 wt. % fluorinated acrylate. A preferred fluorinated acrylate is of the formula: $(R_f)_pQOCOCH=CH_2$ wherein $R_f$ is a fluoroaliphatic radical-containing group having 3 to 20 carbon atoms, optionally, carbon bonded H or Cl substituents may be present provided not more than one H or Cl atom is present for every two C atoms in the $R_f$ group and provided further that $R_f$ contains at least a terminal $CF_3$ group, Q is a polyvalent organic connecting group and p is 1 or 2.

The process of the invention forms vinyl copolymers by solution polymerization wherein monomers are dissolved in an inert liquid and the solution agitated in the presence of initiator at from 25° C. to the boiling point of the solution. Solvents are generally substantially neutral organic liquids, e.g. aliphatic, aromatic, alkyl aromatic or alicyclic hydrocarbons such as hexane, benzene, ethylbenzene or cyclohexane; ketones such as methyl ethyl ketone or acetone; esters such as ethyl acetate or methyl propionate; chlorinated hydrocarbons such as carbon tetrachloride or chloroform; ethers such as ethyl ether or dioxane. At completion of polymerization if the polymer solution is too viscous for convenient handling, the solvent can be stripped away and the solid polymer redissolved in another solvent at a concentration (typically 30 to 60 wt. % polymer) providing a less viscous, more handlable solution.

Polymerization can be conducted in the presence of polymerization modifiers regulating the solubility of the copolymers. These modifiers include chain transfer agents such as alkyl mercaptans, e.g. tert-butyl mercaptan or n-dodecyl mercaptan; the polyhaloalkanes such as carbon tetrachloride, chloroform or bromoform; the nitroalkanes such as nitroethane or 2-nitropropane; liquid hydrocarbons such as toluene, ethylbenzene, or kerotene, etc. The chain transfer agent may be the solvent used during the reaction or it may be incorporated as an extraneous solvent, e.g. dioxane, acetone, isopropanol, paraffin, hydrocarbons, etc.

Usable initiators include organic peroxide compounds such as acetyl, benzoyl, lauroyl or stearoyl peroxide and tert-butyl or cumene hydroperoxide; inorganic percompounds such as hydrogen peroxide, sodium perforate, or potassium persulfate, diazo compounds such as azo-bis-isobutyronitrile (AIBN), alpha, alpha-azodiisobutyramide, etc.

Applications for copolymers from the process of the invention are those advantageously using a composition which during forming continuously varies in composition and molecular weight. These include the antifoam additive application of the noted copending application where the polymer fraction of the total composition having low ethyl acrylate, high 2-ethylhexyl acrylate content and high molecular weight functions well in hydrocarbon oil which at one use condition encounters relatively low (e.g. 25° C.) temperatures while another fraction of the total polymer composition with high ethyl acrylate, low 2-ethylhexyl acrylate content and low molecular weight functions well in such oil over a different higher (up to about 100° C.) use temperature condition range. Flow modifiers dispersed in coating compositions are another potential application where a first molecular weight composition prevents cratering of the coating during deposition on a substrate while another molecular weight composition functions to improve flow and leveling of the coating after deposition as well as, perhaps, promoting release of air trapped in the composition. Adhesives are a further potential application wherein various fractions of a single total polymer composition are designed to balance shear and peel properties.

The invention is further described in the following illustrative Examples which are not intended to limit the invention. Percentages are on a weight basis.

EXAMPLE 1

First Stage

The following are charged at once to a one liter stirred reactor heated to 77–84° C.

197 g solvent (ethyl acetate/isopropanol 98/2 wt. % ratio)
0.35 g AIBN initiator as Vazo® 64 from Dupont Co.
37.5 g ethyl acrylate (EA)
92.5 g 2-ethylhexyl acrylate (EHA)
Initiator/monomers mole ratio=$2.4 \times 10^{-3}$:1

When a solution of the above reaches reflux temperature first stage solution polymerization starts and continues for one hour.

Second Stage

Then two liquid streams identified below as $LS_1$ and $LS_2$ are simultaneously and continuously added over about 30 to 40 minutes to the first stage reaction zone while at 77–84° C.

$LS_1$=120 g EA/EHA (50 g EA, 70 g EHA)
$LS_2$=1.25 g Vazo 64 dissolved in 123 g ethyl acetate/isopropanol mixture-proportions as above for 1st stage.
Initiator/monomers mole ratio=$8.7 \times 10^{-3}$ After charging $LS_1$ and $LS_2$ solutions, polymerization continues for 4 hours followed by solvent stripping at a pressure of about 28 inch Hg. During stripping, pressure is gradually reduced as temperature rises to about 120° C.

Samples of reaction mixture are periodically extracted and analyzed by pyrolysis gas chromatography for composition and by size exclusion chromatography for molecular weight. Results are as follows:

| Sample Identification | Time (min.) after start of polymerization | wt. % EA | wt. % EHA | $M_n$ (Daltons) | $M_w$ (Daltons) |
|---|---|---|---|---|---|
| 1 | 30 | 26.6 | 73.4 | 38,990 | 177200 |
| 2 | 60 (end of 1st stg.) | 27.1 | 72.9 | 38,480 | 175600 |
| 3 | 90 | 31.7 | 68.3 | 36,400 | 166200 |
| 4 | 120 | 33.6 | 66.4 | 29,260 | 152000 |
| 5 | 180 | 36.6 | 63.4 | 22,280 | 145400 |
| 6 | 240 | 36.1 | 63.9 | 19,650 | 143500 |

From the above data, an EA/EHA copolymer fraction is formed in the first stage with Mw of 175,600 Daltons; polymer Mw gradually decreases during the second stage with total polymer Mw of both stages being 143,500 Daltons at the end of the second stage.

EXAMPLE 2

Example 1 is repeated except using the following:
First Stage
197 gms ethyl acetate/isopropanol mixture (90/10 wt. ratio)
0.35 gm—Vazo® 64
2.5 gms 2-(N-butylperfluorooctane-sulfonamido) ethyl acrylate (Fluorad™ FX-189 from 3M Co.) ("FA")
132 gms EA/EHA mixture (24.4/75.6 wt. ratio)
Second Stage
$LS_1$=118 gms EA/EHA (36/64 wt. ratio)
$LS_2$=125 gms Vazo 64 dissolved in 123 gms ethyl acetate/isopropanol mixture—proportions as above.

Final acrylate copolymer analysis (from the first and second stages) is 29.7% EA, 69.3% EHA and 1% FA. Mw is 60,000 Daltons. Elemental fluorine in the acrylate copolymer is 0.49%.

EXAMPLE 3

Example 1 is repeated except using the following:
First Stage
50 g EHA
20 g styrene(s)
200 g solvent containing 187.5 g ethyl acetate (ETAc), 12.5 g isopropanol 0.3 g Vazo 64
Initiator/monomers mole ratio=$3.9 \times 10^{-3}$
Second Stage
$LS_1$=44 g S plus 206 g EHA
$LS_2$=1.2 g Vazo 64 dissolved in 120 g EtAc/isopropanol mixture containing 112.5 g EtAc, 7.5 g isopropanol.
Initiator/monomers mole ratio=$4.8 \times 10^{-3}$ Final polymer Mw=37,700 and contains 21% S, 79% EHA.

EXAMPLE 4

Example 1 is repeated except as follows:
First Stage
18.75 g EA
46.25 g EHA
18.75 g methyl acrylate (MA)
46.25 g butyl acrylate (BA)
0.35 g Vazo 64
Solvent=193 g ETAc plus 3.94 g isopropanol
Initiator/monomers mole ratio=$2.13 \times 10^{-3}$
Second Stage
$LS_1$=25 g EA, 35 g EHA, 25 g MA and 35 g BA
$LS_2$=1.25 g Vazo 64 in 120 g EtAc plus 2.46 g isopropanol
Initiator/monomers mole ratio=$7.62 \times 10^{-3}$ Final polymer Mw=111,6000, Mn=23,280 contains 17.5%EA/30.5%EHA/17.5% MA/32.5%BA.

The preceding description is for illustration and should not be taken as limiting. Various modifications and alterations will be readily suggested to persons skilled in the art. It is intended, therefore, that the foregoing be considered exemplary only and that the scope of the invention be ascertained from the following claims.

We claim:

1. An acrylate copolymner product prepared by the staged method of forming acrylate copolymer by solution polymerization in a single reaction zone which comprises:

a) bulk charging a positive amount up to 90% of at least two acrylate monomers of said acrylate copolymer to a first stage reaction zone;

b) polymerizing said at least two acrylate monomers in the first stage reaction zone to about 10 to 90% conversion in the presence of an initiator to monomers mole ratio, based on the monomers and initiator charged to the first stage, of about $1 \times 10^{-4}:1$, to $5 \times 10^{-2}:1$, the monomer content of one of the at least two acrylate monomers of the copolymer formed in the first stage being higher than the content of another of the at least two acrylate monomers in said first stage copolymer, the weight average molecular weight of the first stage copolymer being about 2000 to 500,000 Daltons; and c) continuing polymerization in the presence of additional initiator in a second stage while continuously adding the additional initiator and the balance of the monomers of said acrylate copolymer, over part or all of the balance of the polymerization cycle in order to maintain a constant initiator to monomers mole ratio for the monomers and initiator charged during the second stage, to the polymerization reaction mixture of the first stage at a monomers ratio lower in said one monomer than in the first stage monomers ratio, the initiator to monomers mole ratio for monomer and initiator charged in the second stage being different than the initiator to monomers mole ratio of monomers and initiator charged in the first stage;

the acrylate copolymer formed gradually continuously changing in weight average molecular weight from the end of said first stage and decreasing in concentration of said one monomer during the second stage, the weight average molecular weight of the total copolymer of the first stage and the second stage being about 2000 to 250,000 Daltons;

wherein said at least two acrylate monomers comprise ethyl acrylate and 2-ethylhexyl acrylate and said one monomer is 2-ethylhexyl acrylate;

wherein said at least two acrylate monomers further comprise a fluorinated monomer selected from fluorinated acrylate, fluorinated methacrylate, or fluoroolefin;

and wherein said fluorinated monomer is a fluoroolefin having the formula $C_nF_{2n+1}CH\odot CH_2$ wherein n is 1–20.

2. The acrylate copolymer of claim 1 wherein said fluorinated monomer is a monomer selected from fluorinated alkyl acrylates having the formula $R_fCH_2CH_2OOCCH=CH_2$ or fluorinated alkyl methacrylates having the formula $R_fCH_2CH_2OOCC(CH_3)=CH_2$, wherein $R_f$ is $C_nF_{2n+1}$ and n is 1–20.

3. The acrylate copolymer of claim 1 wherein said fluorinated monomer is a fluorinated alkyl acrylate having the formula $(R_f)_pQOCOCH=CH_2$ wherein $R_f$ is a fluoroaliphatic radical-containing group having 3 to 20 carbon atoms and at least one terminal $CF_3$ group, Q is a polyvalent organic connecting group, and p is 1 or 2.

* * * * *